Patented Mar. 27, 1928.

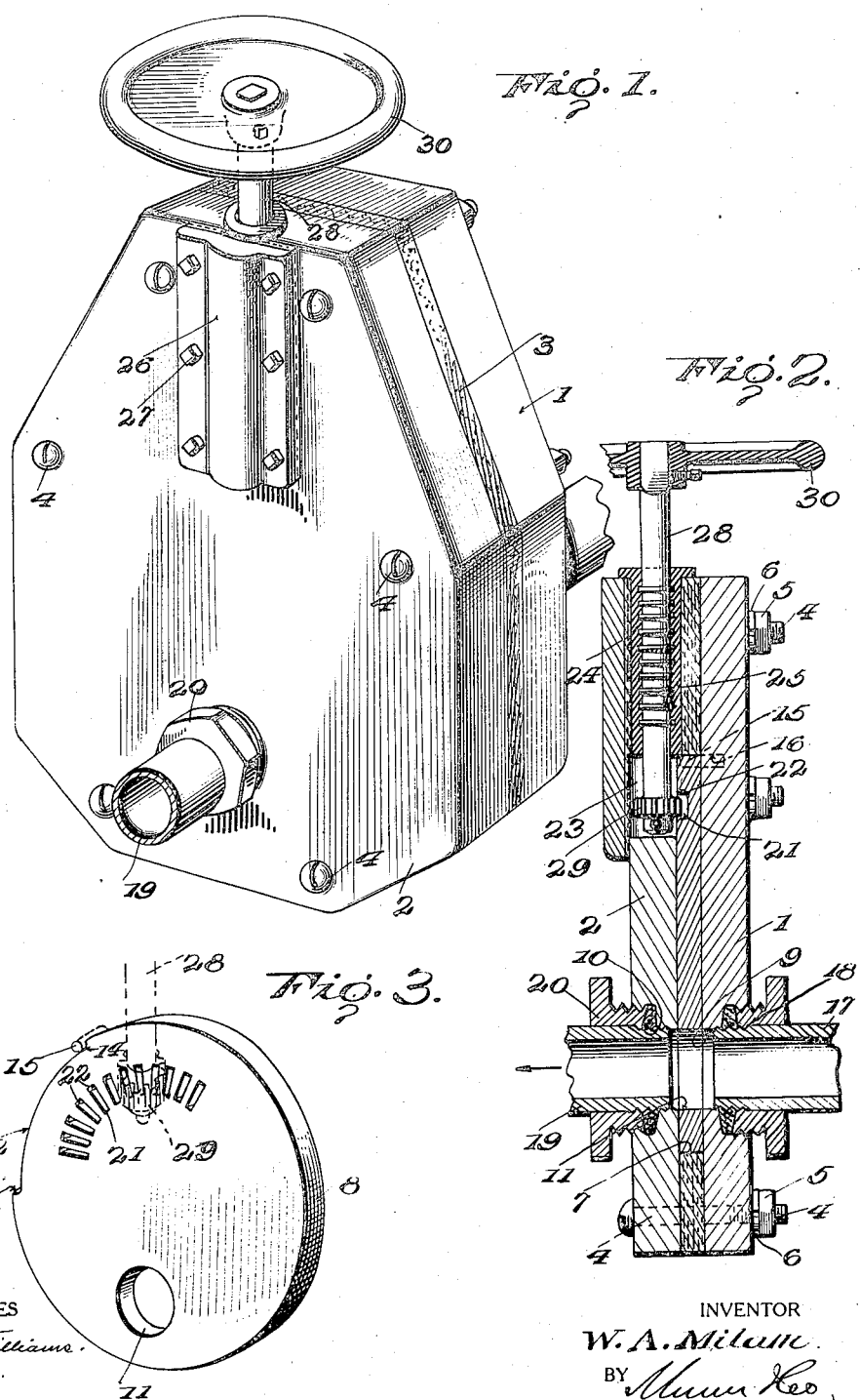

1,664,306

UNITED STATES PATENT OFFICE.

WILLIAM A. MILAM, OF AUSTIN, TEXAS.

PLATE VALVE.

Application filed June 10, 1926. Serial No. 115,076.

My invention relates to improvements in valves, and it consists in the combinations, constructions and arrangements herein described and claimed.

An object of the invention is the provision of a valve which can be opened and closed with relatively great ease against a relatively high pressure.

A further object of the invention is the provision of a valve which includes a rotatably supported valve plate and novel means for supporting the valve plate so that relatively little wear will take place on the contacting surfaces of the valve plate and its support during the operation of the valve.

A still further object of the invention is the provision of a valve of the character described which is reliable in use, comprises but relatively few parts, is not likely to get out of order easily, and is thoroughly practical commercially.

Other objects and advantages of the invention will be apparent from the following description, considered in conjunction with the accompanying drawings, in which Figure 1 is a perspective view of a valve embodying the invention, Figure 2 is a transverse vertical section through the structure exhibited in Figure 1, a portion of the hand wheel of the valve being broken away, Figure 3 is a perspective view of the valve plate, showing also in dotted lines a fragmentary portion of the valve plate operating means.

The casing of the improved valve comprises the plates 1 and 2, respectively, and a compressible gasket 3. The plates 1 and 2 may be made of brass or any other suitable material and the gasket 3 may be made of a suitable fibrous or other packing material. The plates 1 and 2 and the gasket 3 are similarly configured in cross section. The plates 1 and 2 preferably are co-extensive with each other in cross sectional area and the gasket 3 is adapted to fit between the edge portions of the plates 1 and 2 so that the edge of the gasket 3 will be substantially flush with the outer edges of the plates 1 and 2. Fastening devices, such as the bolts 4, extend through registering openings in the plates 1 and 2 and the gasket 3 and are engaged by nuts 5 which may be tightened against lock washers 6 and the plates 1 and 2 thus clamped tightly against the gasket 3 so that fluid tight connections will be established between the plates 1 and 2 and the gasket 3. The gasket 3 is annular in configuration so that a narrow cylindrical chamber will be produced at 7 between the plates 1 and 2 when said plates have been clamped against opposite faces of the gasket 3 in the manner hereinbefore described. A substantially circular valve plate 8 fits snugly, although rotatably, in the chamber 7 and of course is placed within the gasket 3 and between the plates 1 and 2 at the time the assembly of the plates and the gasket is made.

The plates 1 and 2 are formed with aligned transverse openings 9 and 10, respectively, which open into the chamber 7 eccentrically of the latter. The valve plate 8 is formed with an eccentric transverse opening 11 which is adapted to register with the openings 9 and 10 when the valve plate 8 has been turned about its axis in the chamber 7 to a certain position. The valve plate 8 has a shallow peripheral cut-away portion or channel at 12 which extends for part of the circumference of the valve plate 8, whereby shoulders 13 and 14, respectively, are produced at opposite ends of the cut-away portion 12. A stop pin 15 has an end portion secured in a socket 16 in the inner face of one of the plates, as the plate 1, and extends across the cut-away portion 12 in the periphery of the valve plate 8 between the shoulders 13 and 14. The rotative movement of the valve plate 8 thus is limited to the distance between the shoulders 13 and 14 as the stop pin 15 will be engaged by the shoulder 14 when the valve plate is at the limit of its rotative movement in a counter-clockwise direction and the shoulder 13 will engage with the stop pin 15 when the valve plate is at the limit of its rotative movement in the chamber 7 in a clockwise direction. When the shoulder 14 is in contact with the stop pin 15, the opening 11 in the valve plate will be in register with the openings 9 and 10 in the plates 1 and 2 respectively, the valve being open and a free flow of fluid between the openings 9 and 10 through the opening 11 then is permitted. When the valve plate has been rotated in a clockwise direction from the position just mentioned until the shoulder 13 contacts with the stop pin 15, the opening 11 in the valve plate will be moved completely out of register with the openings 9 and 10 and flow of fluid between the openings 9 and 10 thus prevented. The contact of the opposite faces of the plate with the inner faces of the plates 1 and 2 is practically fluid tight.

A fluid supply pipe 17 may be connected with the opening 9 and locked in place by the lock nut 18 and a fluid delivery pipe 19 may be connected with the opening 10 and secured in place by the lock nut 20.

The valve plate 8 is provided with an arcuate recess or chamber 21 which is concentric with its periphery and has a series of radial rack teeth 22 located in said recess. The recess 21 is in the face of the valve plate 8 which is next to the plate 2 and the plate 2 is formed with a slot 23 which extends from the edge of the plate 2 toward the axial line of the valve plate 8 and in the plate 2 slightly beyond the recess 21 in the valve plate 8. A bushing 24 is disposed in the slot 23 and may protrude slightly beyond the inner side of the slot 23 into a groove 25 in the adjacent portion of the gasket 3. The bushing 24 is retained in place in the slot 23 against the gasket 3 by a cap plate 26 which is secured by cap bolts 27 or like fastening devices to the plate 2 in position to cover the outer side of the slot 23. A valve stem 28 extends through the bushing 24 and is journaled in the bushing. The valve stem 28 carries at its inner end a gear 29 in mesh with the rack teeth 22 and operable when the valve stem 28 is rotated about its axis to move the valve plate 8 rotatably in the chamber 7 as required to bring the opening 11 of the valve plate either in complete or partial register with the openings 9 and 10 in the plates 1 and 2 respectively, or completely out of register with the openings 9 and 10. The valve stem 28 may have a hand wheel 30 or any other suitable operating member at its outer end so that it can be actuated conveniently to open or close the valve as desired.

From the foregoing description of the various parts of the device, the operation thereof may be readily understood. The valve plate can be shifted by the operating means that the invention provides as required to open or close the valve with relatively great ease against high pressures. The valve plate will contact over a relatively great area with the walls of the valve chamber and therefore the operation of the valve will be attended by but relatively little wear. The action of the valve therefore will be uniform over a relatively long period of service. Since the valve casing consists essentially of but two plates and a gasket which is disposed between the plates, it will be manifest that the complete valve will be relatively thin for a valve having a given capacity and the valve thus is adapted to be disposed between two pipes which are relatively close to each other or in a space of but slight width.

It will be observed that the plates 1 and 2 may be adjusted towards each other to compress the gasket and thereby produce a water tight joint between the plates, and at the same time compensate for wear between the opposite faces of the valve and adjacent faces of the plates. Moreover, incident to the adjustment of these plates they will frictionally engage the valve and thereby prevent premature actuation of the same by the pressure of water thereagainst.

Obviously, the invention is susceptible of embodiment in forms other than that which is illustrated in the accompanying drawings, and I therefore consider as my own all such modifications and adaptations thereof as fairly fall within the scope of the appended claim.

I claim:—

In a valve, a pair of opposed spaced plates having opposed flat faces and further provided with registering ports, a compressible gasket interposed between the plates having a circular opening, a disc valve rotatable in the opening and movable between the ports with its opposite faces contacting with the plates and having a port normally disposed out of registration with the first mentioned ports, but adapted to be brought into registration with the latter upon rotation of the disc valve in one direction, the walls of the circular opening defining a guide for the rotatable valve to prevent the latter from bodily shifting edgewise, and adjustable fastenings passing thru the plates and gasket whereby to draw the plates into water tight engagement with the gasket, and into frictional contact with the valve to compensate for wear, and to prevent premature rotation of the valve.

WILLIAM A. MILAM.